E. ROLLINSON & E. E. MOXHAM.
TOOL HOLDER.
APPLICATION FILED NOV. 12, 1915.
1,193,426.
Patented Aug. 1, 1916.
2 SHEETS—SHEET 1.
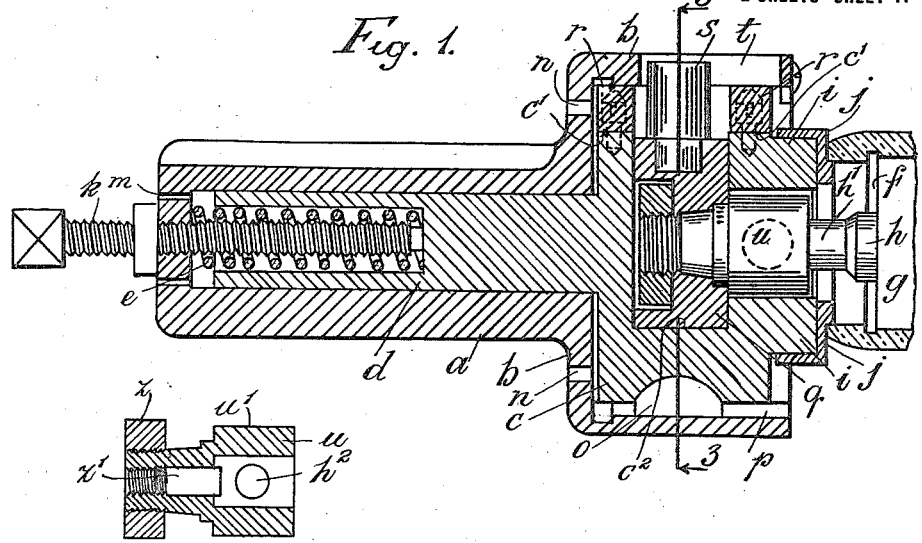
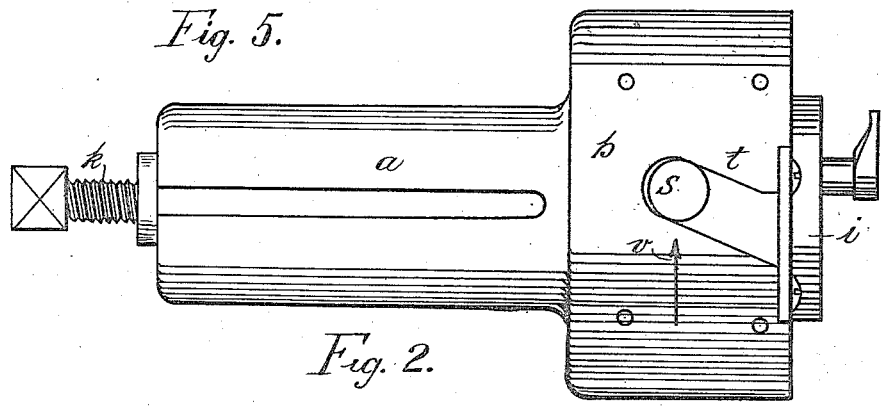
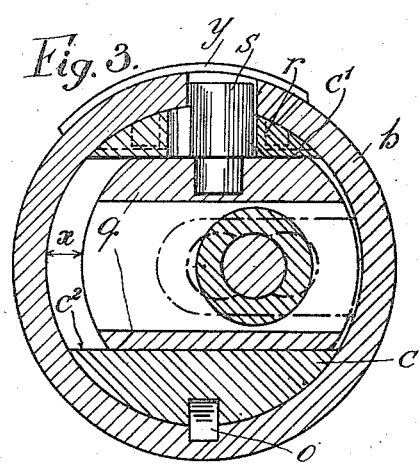
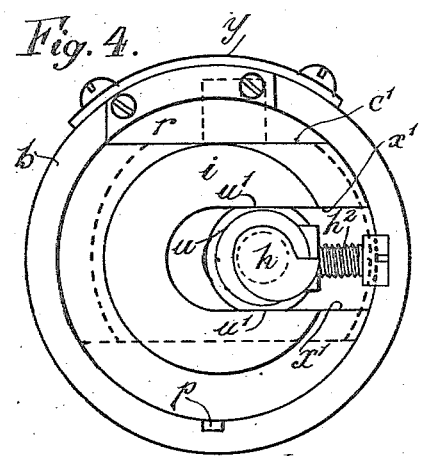
E. Rollinson and
E. E. Moxham
Inventors
By
Attorney

UNITED STATES PATENT OFFICE.

ERNEST ROLLINSON AND EDWARD ERNEST MOXHAM, OF LONDON, ENGLAND, ASSIGNORS TO THE COATS MACHINE TOOL COMPANY LIMITED, OF LONDON, ENGLAND.

TOOL-HOLDER.

1,193,426.  Specification of Letters Patent.  Patented Aug. 1, 1916.

Application filed November 12, 1915. Serial No. 61,147.

*To all whom it may concern:*

Be it known that we, ERNEST ROLLINSON and EDWARD ERNEST MOXHAM, both subjects of the King of Great Britain, residing at London, England, have invented certain new and useful Improvements in Tool-Holders, of which the following is a specification.

This invention relates to an improved tool holder for use in undercutting or recessing internal or external grooves.

The object of the invention is to provide a tool holder of this class which will facilitate setting and render the work more or less automatic.

A further object is to provide a tool holder which may be used on a lathe for undercutting either internally or externally without fear of chattering.

According to this invention the tool holder is provided with a longitudinally slidable member having a tool slide therein which is operated to move transversely to the movement of the tool holder when relative movement takes place between the tool holder and the slidable member.

The invention will be more readily understood on reference to the accompanying drawings which illustrate two convenient forms by way of example.

Figure 6:
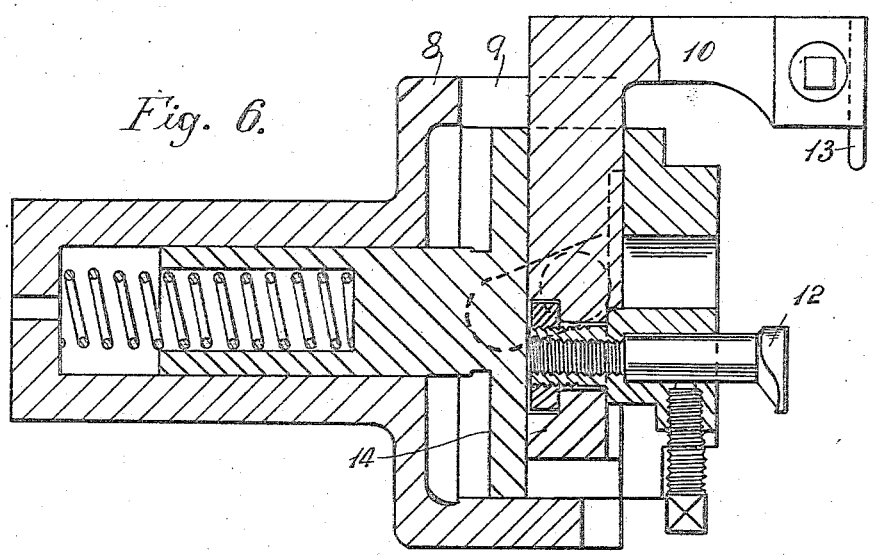
Figure 7:
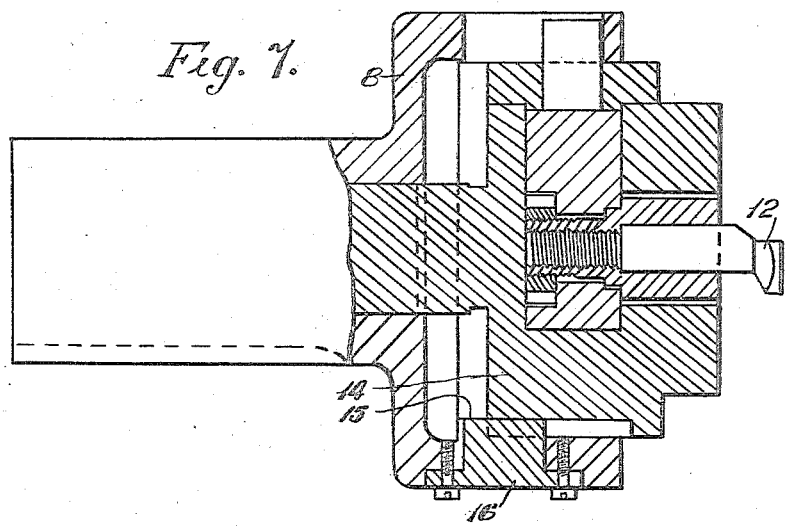

In these drawings:—Figure 1 is a longitudinal section of a tool holder according to this invention as arranged for internal undercutting—that is to say, for example, undercutting inside a tubular piece. Fig. 2 is an outside elevation. Fig. 3 is a section on the line 3—3 of Fig. 1. Fig. 4 is a front elevation of the tool holder shown in Fig. 1. Fig. 5 is a detail view of the tool carrier. Fig. 6 is a sectional plan of a modified form of tool holder having means for undercutting externally and internally at the same time. The tools are shown in their extreme out position, that is before the cut has been made. Fig. 7 is a sectional elevation at right angles to the view shown in Fig. 6.

In carrying the invention into effect according to the form shown in Figs. 1 to 5, a casing or frame $a$ is provided and is carried by the slide rest of the lathe or the like on which the tool holder is employed. The casing may be of any suitable shape, but the form shown is preferable and has a hollow cylindrical stem and a cylindrical head $b$ forming a cam and also a housing for the tool slide. This form of casing gives excellent guides for the sliding movement of the stock head $c$. The cam head $b$ is hollow and there fits in it the stock head $c$ while the stem $d$ of the stock is guided in the hollow stem of the casing. A spring $e$ tends to keep the stock in its extreme outward position, that is to say at one extreme limit of the relative sliding movement of the casing and stock. In Fig. 1 the stock is shown in its extreme inner portion within the casing when the groove $f$ has been undercut in the work $g$. The transverse movement of the tool $h$ is effected by a relative sliding movement of the casing $a$ over the stock $c$. The stock $c$ has a nose piece $i$ on which a cap $j$ is fitted to suit the particular job in hand. The distance between the face of the cap $j$ and the tool $h$ is the exact distance in of the groove $f$ from the outer edge of the piece of work $g$. Various caps can be employed for various jobs. When the cap comes up against the end of the piece $g$ the spring $e$ is compressed and the stock $c$ and casing $a$ move relatively. The amount of this relative movement may be adjusted by means of a screw $k$. Air holes $m$ and $n$ permit the relative sliding movement of the casing $a$ and stock $c$ to take place without hindrance.

The stock $c$ is prevented from rotating within the casing by a feather $o$ slidable in a keyway $p$ in the interior of the cam head $b$.

The enlarged head $c^3$ of the stock $c$ is flattened at one side $c'$ and is also recessed to the depth $c^2$. The recess is occupied by a tool slide $q$ and over the recess and pinned to the flattened face $c'$ there is a cover $r$. As can be seen from Fig. 3 the tool slide $q$ can move transversely by an amount $x$ being guided between the flat face $c^2$ and the stock cover piece $p$. The tool slide $q$ has fixed in it a member such as a pin $s$ which projects into the inclined slot $t$ of the cam head $b$. A suitable tool clamp or carrier $u$ is fixed in the tool slide. If desired a number of socket holes such as $w$ may be provided for the tool clamp to enable rough adjustment for different diameters of groove.

A preferred form of tool carrier is shown in the drawings and its construction will be more readily understood from Fig. 5. The carrier $u$ has flattened faces $u'$ seen more clearly in Fig. 4 which fit between the flat faces $x'$. The stem of the carrier is passed through one or other of the sockets $w$ and a collar $z$ is threaded on to the end so as to bind the tool carrier $u$ firmly to the slide. The tool carrier is hollow and a pin $z'$ is threaded into the end to act as an abutment for the stem $h'$ of the tool $h$. By adjusting or varying the pin $z'$ the position of the tool may be fixed within short limits and when the tool is taken out for grinding purposes the abutment pin $z'$ forms a fixed gage for its reinsertion to assure that the tool will be in the proper position to which it was originally set. A clamping screw $h^2$ holds the tool rigidly in place.

It will be understood that in operation the tool is set so that at the end of the relative movement of the casing $a$ and stock $c$ the tool is projected laterally or transversely to the relative sliding movement of the casing $a$ and stock $c$. This transverse movement starts when the cap $j$ engages on the end of the work. As the stock and casing cannot rotate relatively to each other the pin $s$ during the relative sliding movement of the casing $a$ and stock $c$ travels laterally or transversely as shown by the arrow $v$ in Fig. 2, where the dust cap $y$ has been removed to reveal the cam slot $t$. On withdrawing the casing the spring $e$ retains the stock in contact with the work $g$ until the tool $h$ is withdrawn from the groove $f$ by the reversal of the process described above. By employing tubular or cylindrical guides for the relative axial movement of the casing and stock all chattering is prevented and a very steady and rigid transverse guide is given for the tool slide. The flattened faces $u'$ and guide surfaces $x'$ also materially assist in producing this effect as will be readily appreciated. It has also been found that this form of holder is stronger in practice than other types which are liable to break off at the neck.

The tool holder according to this invention may be made to cut grooves simultaneously on the outer and inner surfaces of a cylindrical piece of work or on either of these surfaces separately. For this purpose the cam head 8, Fig. 6, is provided with a slot 9 through which there passes an arm 10 attached to the tool slide 11. The internal tool 12 and the external tool 13 are, as will be readily understood, set in opposite directions. In Fig. 6 the tools are set for rotation of the work in a clockwise direction when looking at the front of the work. The tool 12 cuts on the upper face seen in plan while the tool 13 cuts on the under face.

According to the form shown in Figs. 6 and 7 the stock 14 is prevented from rotating relatively to the casing or cam head 8 by a guide face 15 on a block 16 fixed in the die head. In this form also the adjusting screw for the relative axial movement of the stock and casing has been omitted. The construction otherwise is substantially identical with that shown in Figs. 1 to 5. The operation of the device shown in Figs. 6 and 7 will be readily understood and need not be further explained.

We claim:—

1. A tool holder having a cylindrical casing, a cam head on said casing, a stock guided to slide axially in the casing, means for preventing relative rotary movement between the stock and casing, an enlarged recessed head on the stock and fitting within the cam head of the casing, a tool slide movable transversely to the axis of the stock and casing within the recess in said enlarged head, and a pin projecting from said tool slide to engage with the cam on the cam head.

2. A tool holder having a cylindrical casing, a cam head on said casing, a stock guided to slide axially in the casing, a spring pressing the stock and casing apart, means for adjusting the amount of relative sliding movement of the casing and stock, means for preventing relative rotary movement between the stock and casing, an enlarged recessed head on the stock and fitting within the cam head of the casing, a tool slide movable transversely to the axis of the stock and casing within the recess in said enlarged head, and a pin projecting from said tool slide to engage with the cam on the cam head.

3. A tool holder having a cylindrical casing, a cam head on said casing, a stock guided to slide axially in the casing, means for preventing relative rotary movement between the stock and casing, an enlarged recessed head on the stock and fitting within the cam head of the casing, said head being flattened at one side, a tool slide movable transversely to the axis of the stock and casing within the recess in said enlarged head, a cover piece over the flattened portion of the head and closing the recess therein, and a pin projecting from said tool slide and through said cover piece to engage with the cam on the casing head.

4. A tool holder having a cylindrical casing, a cam head on said casing, a stock guided to slide axially in the casing, means for preventing relative rotary movement between the stock and casing, an enlarged recessed head on the stock and fitting within the cam head of the casing, said head being flattened at one side, a tool slide movable transversely to the axis of the stock and casing within the recess in said enlarged head, a cover piece over the flattened portion of the head and closing the recess therein, a pin projecting from said tool slide and through said cover piece to engage with the cam on the casing head and an external and internal tool clamp carried by said tool slide.

In testimony whereof we have signed our names to this specification in the presence of two subscribing witnesses.

ERNEST ROLLINSON.
EDWARD ERNEST MOXHAM.

Signed by the said Ernest Rollinson and Edward Ernest Moxham in the presence of—

H. W. HAMPTON,
E. I. WOODYARD.